(12) United States Patent
Renner et al.

(10) Patent No.: US 8,769,977 B2
(45) Date of Patent: Jul. 8, 2014

(54) HEAT EXCHANGER ARRANGEMENT

(75) Inventors: Markus Renner, Riemerling (DE); Theresia Koppe, Gilching (DE)

(73) Assignee: Webasto AG, Stockdorf (DE)

( * ) Notice: Subject to any disclaimer, the term of this patent is extended or adjusted under 35 U.S.C. 154(b) by 90 days.

(21) Appl. No.: 13/392,033

(22) PCT Filed: Nov. 25, 2010

(86) PCT No.: PCT/DE2010/075144
§ 371 (c)(1), (2), (4) Date: May 29, 2012

(87) PCT Pub. No.: WO2011/076198
PCT Pub. Date: Jun. 30, 2011

(65) Prior Publication Data
US 2012/0247715 A1  Oct. 4, 2012

(30) Foreign Application Priority Data
Dec. 21, 2009  (DE) .......................... 10 2009 059 237

(51) Int. Cl.
*B60H 1/32* (2006.01)
*B60H 1/00* (2006.01)
*B60H 1/03* (2006.01)

(52) U.S. Cl.
CPC .. *B60H 1/00385* (2013.01); *B60H 2001/00307* (2013.01); *F01P 2060/08* (2013.01); *B60H 1/034* (2013.01)
USPC .............................................. 62/239; 62/244

(58) Field of Classification Search
CPC ............... B60H 1/00385; B60H 1/034; B60H 2001/00307; F01P 2060/08
USPC ........ 62/239, 244, 236, 515, 513; 165/41, 42, 165/122; 237/12.3 C, 12.3 R
See application file for complete search history.

(56) References Cited

U.S. PATENT DOCUMENTS 5,253,806 A * 10/1993 Gaysert et al. ........... 237/12.3 C
(Continued)

FOREIGN PATENT DOCUMENTS

| CN | 1176901 A | 3/1998 |
|---|---|---|
| CN | 1278492 A | 1/2001 |
| CN | 1625492 A | 6/2005 |
| DE | 4115138 A1 | 11/1992 |
| DE | 4238364 A1 | 5/1994 |

(Continued)

OTHER PUBLICATIONS

Von Roland Burk et al; "Integrales Klimasystem für Elektroautomobile"; ATZ Automobiltechnische Zeitschrift 94 (1992); vol. 94; No. 11; pp. 582-588.

*Primary Examiner* — Mohammad M Ali
(74) *Attorney, Agent, or Firm* — Fitch, Even, Tabin & Flannery, LLP

(57) ABSTRACT

A heat exchanger arrangement is made available for heating an area of a vehicle which is to be heated, having: a first heat exchanger element for transmitting waste heat from at least one vehicle electrical component to be cooled to air, and a second heat exchanger element for transmitting heat from at least one vehicle heating device to air. The first heat exchanger element and the second heat exchanger element are arranged in such a way that air (L) to be heated is successively applied to them.

11 Claims, 1 Drawing Sheet

(56) References Cited

U.S. PATENT DOCUMENTS

| | | | |
|---|---|---|---|
| 5,971,287 A * | 10/1999 | Kettner et al. | 236/44 A |
| 6,332,497 B1 | 12/2001 | Niwa et al. | |
| 6,516,623 B1 | 2/2003 | Collier | |
| 6,584,785 B1 | 7/2003 | Karl | |
| 6,920,914 B2 * | 7/2005 | Schurle et al. | 165/42 |
| 7,216,812 B2 * | 5/2007 | Eberspach et al. | 237/12.3 R |
| 2002/0043413 A1 | 4/2002 | Kimishima et al. | |
| 2004/0069445 A1 * | 4/2004 | Schurle et al. | 165/42 |
| 2006/0000593 A1 * | 1/2006 | Schlecht et al. | 165/202 |
| 2006/0144045 A1 * | 7/2006 | Schroeder et al. | 60/602 |
| 2008/0041071 A1 | 2/2008 | Itoh | |

FOREIGN PATENT DOCUMENTS

| | | |
|---|---|---|
| DE | 4327261 C1 | 10/1994 |
| DE | 19545449 A1 | 6/1997 |
| DE | 19609048 A1 | 9/1997 |
| DE | 19755193 A1 | 6/1998 |
| DE | 19960960 C1 | 4/2001 |
| DE | 19954327 A1 | 7/2001 |
| EP | 0634565 A1 | 1/1995 |
| JP | 11115466 A | 4/1999 |
| JP | 2007-278624 A | 10/2007 |
| KR | 1020070077546 A | 7/2007 |

* cited by examiner

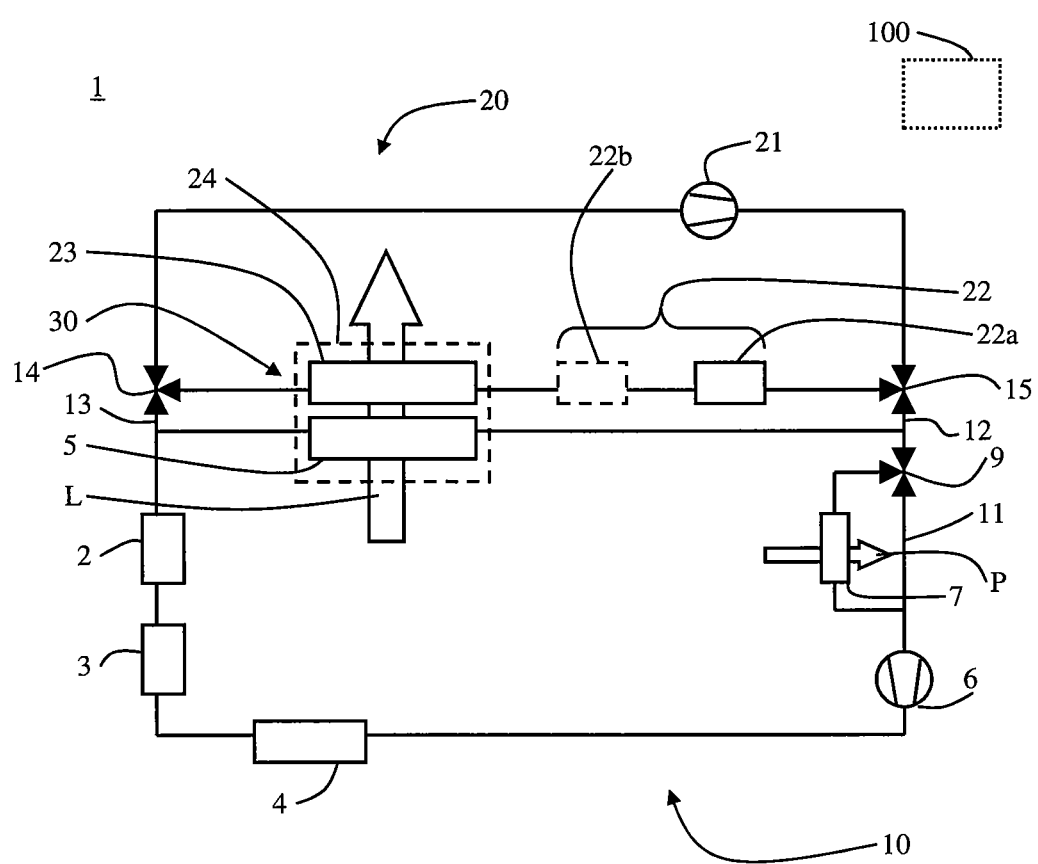

HEAT EXCHANGER ARRANGEMENT

CROSS-REFERENCE TO RELATED APPLICATIONS

This Application is a U.S. national phase application filed under 35 U.S.C. §371 of International Application No. PCT/DE2010/075144, filed Nov. 25, 2010, designating the United States, which claims priority from German Patent Application Nos.: DE 10 2009 059 237.7, filed Dec. 21, 2009, which are hereby incorporated herein by reference in their entirety for all purposes.

The present invention relates to a heat exchanger arrangement for heating an area of a vehicle which is to be heated.

It is known for an area of a vehicle, for example the interior space of a motor vehicle, which is to be heated to be heated by means of a heat exchanger arrangement to which air which is to be heated is applied (i.e. air which is to be heated is made to flow around or through said heat exchanger arrangement) and said air is fed to the area which is to be heated. In conventional road vehicles having an internal combustion engine, the waste heat of the internal combustion engine is generally used for heating by virtue of the fact that the warm engine cooling liquid is conducted through a heat exchanger arrangement in which the heat is transmitted to air to be heated. In modern efficient internal combustion engines, the heat which is given off is often no longer sufficient to heat the passenger compartment sufficiently, with the result that to a certain extent supplementary vehicle heating devices are used. The supplementary vehicle heating devices can be configured here in such a way that they are integrated into the engine cooling liquid circuit and heat the engine cooling liquid. Such supplementary vehicle heating devices can be implemented as back-up heaters which make available heat for heating purposes only when the drive engine is running, or as stationary-state heaters which can make available heat for the purpose of heating both when the drive engine is running and when said engine is stationary.

In what are referred to as hybrid vehicles, which have an electric drive motor and an internal combustion engine drive engine, and in electric vehicles which have only one electric drive motor, the problem that sufficient waste heat for heating an area to be heated is not available from the vehicle drive in all operating states occurs to a greater degree.

DE 199 54 327 A1 describes a method and a device for transporting thermal energy which occurs in a motor vehicle, in which method the waste heat of an electrical component is used to heat other vehicle parts such as, for example, the internal combustion engine or the passenger compartment. It is described that two cooling circuits are coupled to one another and decoupled in order to control the flow of heat.

The object of the present invention is to make available a heat exchanger arrangement and a vehicle heating circuit which permit improved heating of an area of a vehicle which is to be heated.

The object is achieved by means of a heat exchanger arrangement as claimed in claim 1. Advantageous developments are given in the dependent claims.

The heat exchanger arrangement for heating an area of a vehicle which is to be heated has: a first heat exchanger element for transmitting waste heat from at least one vehicle electrical component to be cooled to air, and a second heat exchanger element for transmitting heat from at least one vehicle heating device to air. The first heat exchanger element and the second heat exchanger element are arranged in such a way that air to be heated is successively applied to them.

A vehicle is understood to be a land vehicle, watercraft or aircraft. These may be, in particular, motor vehicles which have a drive motor. The drive motor may be formed here, for example, by an internal combustion engine, by an electric motor or by what is referred to as a hybrid drive. The present invention is advantageous, in particular, when electric motors and hybrid drives are used in which an accumulator, an electric motor and associated power electronics give off heat which has to be conducted away. The area of the vehicle which is to be heated can be formed by an enclosed space such as, for example, the interior space of a road vehicle or by an open or partially open space such as, for example, is frequently found in yachts. The term "electrical component to be cooled" is understood here to be an electrical component from which heat has to be conducted away so that it does not overheat. In particular, an electrical component to be cooled is not understood to be an electrical component which is supplied with electrical power for the purpose of making heat available, such as, for example, in the case of a resistance heater, for example a PTC element. The term "vehicle heating device" is understood in this context to be a device which is provided in a vehicle for the purpose of making available heating power such as, for example, a fuel-operated vehicle heating unit or an electric resistance heater which can be formed, for example, by a PTC element.

Since the first heat exchanger element and the second heat exchanger element are arranged in such a way that air which is to be heated is successively applied to them, the air which is to be heated can be heated efficiently both by the waste heat of the electrical components to be cooled and by the vehicle heating device. Since two different heat exchanger elements are available for the waste heat of the electrical components and the waste heat of the vehicle heating device, a high temperature circuit and a low temperature circuit can be implemented, wherein the low temperature circuit can efficiently make available the dissipated heat from electrical components such as, for example, of an accumulator, an electric motor and associated power electronics, via the first heat exchanger element in order to heat the area to be heated. If a large quantity of heat is necessary for the area to be heated, it is possible, in addition to the use of the waste heat of the electrical components, for simultaneous operation of the vehicle heating device at a relatively high temperature level to take place in order to make heat available additionally via the second heat exchanger element. Since the heating air can already be pre-heated with the waste heat of the electrical components, the vehicle heating device only has to make available a relatively small quantity of heat in order to make available a sufficient heating capacity for the area to be heated. Consequently, the vehicle heating device can be operated at a relatively low power level, as a result of which the energy demand of the vehicle heating device is reduced. In the case of a fuel-operated vehicle heating apparatus, this reduces the fuel consumption, and in the case of an electrical heating element it reduces the electrical power consumption. If there is only a low heating capacity demand for the area to be heated, heating can be carried out solely with the waste heat of the electrical components. The vehicle heating device therefore needs to be operated only if it makes a high heating power demand necessary. The first heat exchanger element and the second heat exchanger element can be integrated very easily into one heating, ventilation and air-conditioning system (HVAC module) which is provided via a vehicle manufacturer. Owing to the provision of the second heat exchanger element, there is no need to provide any electrical high voltage PTC back-up heater in the air stream of the air to be heated to bring about sufficient heating of the area to be heated, with the result that there is no need to provide any high voltage components in an interior space of the vehicle. This significantly improves safety.

Compared with the case in which a vehicle heating device, in particular a fuel-operated heating apparatus, is integrated into the cooling liquid circuit of an electric vehicle or hybrid vehicle in such a way that the heat which is made available is transmitted to air to be heated only via a heat exchanger which is arranged in the general cooling liquid circuit, the heat exchanger arrangement which is made available has significant advantages. Since the electrical components to be cooled have a relatively low permissible temperature level, when the vehicle heating device is connected into the general cooling fluid circuit of the vehicle, which also has the electrical components, in a heating mode in which a large amount of heating capacity is to be input into the area to be heated, the electrical components would have to be disconnected from the part of the cooling liquid circuit in which the heat exchanger for heating air is arranged. The waste heat of the electrical components to be cooled would then have to be conducted away to the surroundings via a radiator and would no longer be available for heating the area to be heated. Compared with the case in which supplementary heating is carried out only by using an electric resistance heater, without at the same time using the waste heat of the electrical components, the proposed implementation avoids bringing about a reduction in the range when using an electric vehicle drive, which reduction can be up to 50% in the case of exclusively electric heating. The heat exchanger arrangement which is made available therefore permits an increased range. In addition, in the case of operation during travel only a relatively small amount of discharging of the battery occurs, which leads to a reduced re-charging time of the vehicle battery and to significantly lower loading of the battery. This also results in a longer battery service life.

According to one refinement, the first heat exchanger element and the second heat exchanger element are arranged in such a way that the air to be heated is firstly applied to the first heat exchanger element and then to the second heat exchanger element. In this case, the temperature level of the first heat exchanger element, which is generally lower, is used to preheat the air to be heated, and the relatively high temperature level of the second heat exchanger is used for the further heating. As a result, the different temperature levels are utilized efficiently.

If the first heat exchanger element and the second heat exchanger element are each formed as liquid-to-air heat exchangers, the heat can be respectively supplied to the first heat exchanger element and to the second heat exchanger element via liquid circuits. In particular, if the vehicle heating device has an electric resistance heater, it is possible in this way to avoid providing high voltage components in direct contact with an interior space of the vehicle. The respective liquid circuits can advantageously also be used to heat the electrical components when necessary likewise by means of the vehicle heating device. A liquid-to-air heat exchanger is understood in this context to be a heat exchanger in which the heat is transmitted from a liquid (as the heat carrier medium) to air. The liquid can be formed here, for example, by a customary cooling liquid such as, for example, a water/glycol mixture or the like.

According to one refinement, the first heat exchanger element and the second heat exchanger element are thermally decoupled from one another. The term thermally decoupled is understood here to mean that the first heat exchanger element and the second heat exchanger element are formed in such a way that the temperature level of the first heat exchanger element is not affected directly by the temperature level of the second heat exchanger element, and vice versa. In this case, the first heat exchanger element can reliably be operated at a relatively low temperature level, which is appropriate for conducting away heat from the electrical components, and the second heat exchanger element can be operated at a relatively high temperature level, in order to input sufficient heating capacity into the area to be heated.

According to one refinement, the first heat exchanger element and the second heat exchanger element are arranged in a common housing. In this case, the heat exchanger arrangement is made available in a particular compact form and can be integrated without a high degree of expenditure into a heating, ventilation and air-conditioning module (HVAC module) of a vehicle.

According to one refinement, the at least one electrical component to be cooled comprises a vehicle battery and/or an electric vehicle drive motor and/or at least one electronic component of the drive train of the vehicle. In this case, a heat exchanger arrangement is made available with which, in particular in the case of an electric vehicle or hybrid vehicle, the waste heat from electrical components can be efficiently used to heat an area to be heated such as, for example, a passenger compartment. Electronic components of the drive train can be formed, in particular, by the power electronics which are necessary for an electric drive.

According to one refinement, the at least one vehicle heating device has a fuel-operated vehicle heating apparatus. In this case, heat for the area to be heated can be efficiently made available by the conversion of fuel and combustion air, without loading the power supply of the vehicle, in particular an accumulator. In particular in the case of electric vehicles or hybrid vehicles, the fuel-operated vehicle heating apparatus can additionally also be used, when necessary, to make available heat for, for example, the accumulator or the electric motor. In this way it is possible to implement, for example, a stationary state heating mode which does not load a starter battery or an accumulator which is necessary for the drive.

According to one refinement, the at least one vehicle heating device has an electric resistance heater. The electric resistance heater can also be provided here, in particular, in addition to a fuel-operated heating apparatus. The electric resistance heater can be implemented, in particular, by means of known PTC heating elements. Heating can be effectively carried out with the electric resistance heater when, for example, sufficient electric power is available, for example in the case of a full accumulator or when the accumulator is being charged at a stationary charging station (for example in the case of an electric car). In addition, the electric resistance heater can be used to make available heating power for the area to be heated without exhaust gases being released such as occurs when a fuel-operated heating apparatus is operated. In this case, for example efficient heating can be achieved in areas in which it is not permitted to operate a fuel-operated heating apparatus, for example in multistory car parks or zero emission zones. If both a fuel-operated heating apparatus and an electric resistance heater are combined, the respective advantages of the two types of heating are implemented. In addition, it is also possible, for example, to make available, when necessary, a particularly large heating capacity for the area to be heated by simultaneously operating the fuel-operated heating apparatus and the electric resistance heater.

According to one refinement, the vehicle heating device is configured in such a way that when an electrical supply voltage is available only the electric resistance heater makes available heat. In this case, when an electrical supply voltage is available (for example when the vehicle battery is being charged), no fuel is consumed for a fuel-operated heating apparatus as the latter is not operated. The heat which is made available by the electric resistance heater can be used to heat a vehicle interior space and/or heat the electrical components.

The object is also achieved by means of a vehicle heating circuit according to claim 10. Advantageous developments are given in the dependent claims.

The vehicle heating circuit has a heat exchanger arrangement which is described above. With the vehicle heating circuit, the respective advantages described above are achieved.

According to one refinement, the first heat exchanger element is connected into a first liquid circuit in which the at least one electrical component to be cooled is arranged. In this case, the transportation of heat from the electrical component to be cooled to the first heat exchanger element can take place via the liquid circulating in the liquid circuit. In particular, the first heat exchanger element can be arranged spatially remote here from the components to be cooled so that a high degree of variability is provided. It is possible, in particular, for a plurality of electrical components to be cooled, for example an accumulator, an electric motor and associated power electronics, to be connected easily into the first liquid circuit. In this context, the liquid of the first liquid circuit preferably flows around and/or through the first heat exchanger.

According to one refinement, the second heat exchanger element is connected into a second liquid circuit in which the vehicle heating device is arranged. In this case, the transportation of heat from the vehicle heating device to the second heat exchanger element can take place by means of the liquid which circulates in the second liquid circuit. This permits a spaced-apart arrangement of the second heat exchanger element from the vehicle heating device. In addition, in this case the vehicle heating device can also be easily connected in in such a way that active heating of the electrical components is also made possible if necessary (for example at low external temperatures). If the vehicle heating device is an electric resistance heater, this implementation also has the advantage that no high voltage components (the electric resistance heater) have to be arranged in the vehicle interior space or in direct contact therewith, which provides a significant advantage in terms of safety. The liquid of the second liquid circuit preferably flows around and/or through the second heat exchanger here.

According to one refinement, the first liquid circuit and the second liquid circuit can be connected to one another in such a way that the electrical components can be heated with the vehicle heating device. In this case, the vehicle heating device can perform a double function, specifically, on the one hand, heating of the area to be heated and, on the other hand, heating of the electrical components if this is necessary. The configuration is preferably such that the first liquid circuit and the second liquid circuit are connectable to one another and disconnected from one another again by means of a controller, with the result that easy switching over between various operating states is made possible.

Further advantages and developments emerge from the following description of exemplary embodiments with reference to the appended drawing.

FIG. 1 shows a vehicle heating circuit with a heat exchanger arrangement according to one embodiment.

One embodiment is described below with reference to FIG. 1. FIG. 1 shows a vehicle heating circuit 1 according to one embodiment. In the illustrated embodiment, the vehicle heating circuit 1 is implemented in an electric vehicle which is driven by means of an electric motor 2. Power electronics 3 are provided which form an electronic component of the drive train. An accumulator 4 is additionally provided for supplying the power electronics 3 and the electric motor 2 with electrical energy. The accumulator 4, the power electronics 3 and the electric motor 2 form vehicle electrical components to be cooled. Heat has to be conducted away from these components to be cooled during operation (at least in some operating states of the vehicle) in order to ensure that operation is maintained and/or damage to the components is prevented.

The components to be cooled, that is to say in the case illustrated in FIG. 1 the accumulator 4, the power electronics 3 and the electric motor 2, are connected into a first liquid circuit 10 in which a liquid is circulated with which the heat to be conducted away is conducted away from the components to be cooled. The first liquid circuit 10 also has a first heat exchanger element 5, a pump 6 for circulating the liquid in the first liquid circuit and an air cooler 7. In the region of the air cooler 7, a bypass line 11 is provided in the first liquid circuit 10, with which bypass line 11 the liquid can be optionally circulated while bypassing the air cooler 7. In the first liquid circuit 10, a valve 9 is arranged with which it is possible to adjust what proportion of the circulated liquid is conducted through the air cooler 7 and what proportion is circulated through the bypass line 11. The valve 9 is connected to a schematically illustrated controller 100 and can be actuated thereby. The valve 9 can be embodied, for example, as a solenoid valve. The air cooler 7 is embodied in such a way that it can be subjected to an airstream with which heat can be conducted away to the outside to the surroundings of the vehicle, as is illustrated schematically by an arrow P.

The first heat exchanger element 5 forms part of a heat exchanger arrangement 30 which is designed to be subjected to an air flow of air to be heated, as is illustrated schematically by an arrow L. The air to be heated is fed in the vehicle to an area to be heated which can be formed, for example, by the passenger compartment of the vehicle. The heat exchanger arrangement 30 can be arranged, for example, in the flow path of a heating, ventilation and air-conditioning system (HVAC module) of the vehicle in which an airstream is made available by a blower. The heat exchanger arrangement 30 is arranged here in such a way that the airstream flows around or through it. The first heat exchanger element 5 is embodied as a liquid-to-air heat exchanger in which heat is transmitted from the liquid circulated in the first liquid circuit 10 to the air to be heated.

As is illustrated in FIG. 1, a second liquid circuit 20 is provided in which a liquid can also be circulated. A pump 21, a vehicle heating device 22 and a second heat exchanger element 23 are arranged in the second liquid circuit 20. The pump 21 is designed to circulate the liquid in the second liquid circuit 20. In the illustrated embodiment, the vehicle heating device 22 has a fuel-operated heating apparatus 22a which makes available heat by converting fuel with combustion air. The fuel-operated heating apparatus 22a is embodied as a liquid heating apparatus in which the heat which is made available is transferred to the liquid which is circulated in the second liquid circuit 20. As is illustrated by dashes in FIG. 1, the vehicle heating device 22 can also have an electric resistance heating element 22b which is also designed to transfer heat which is given off to the liquid which is circulated in the second liquid circuit 20.

The second heat exchanger element 23 also forms part of the heat exchanger arrangement 30. The second heat exchanger element 23 is embodied as a liquid-to-gas heat exchanger and is arranged in such a way as to transfer heat from the liquid circulated in the second liquid circuit 20 to the air to be heated.

The first liquid circuit 10 and the second liquid circuit 20 are connected to one another via connecting lines 12 and 13. Valves 14 and 15 are provided with which the first liquid circuit 10 and the second liquid circuit 20 can be connected to one another and disconnected from one another, as is also described below in more detail. The valves 14 and 15 are connected to the controller 100 and can be actuated by it. The valves 14 and 15 can be formed, for example, by solenoid valves.

The first heat exchanger element 5 and the second heat exchanger element 23 are arranged, in the illustrated embodiment, in a common housing 24 as is represented schematically in FIG. 1 by a dashed box. The common housing 24 is designed to be arranged in the airflow path of a heating, ventilation and air-conditioning system (HVAC module) of a vehicle. The first heat exchanger element 5 and the second heat exchanger element 23 are arranged thermally decoupled from one another here, with the result that their temperatures do not significantly influence one another. The first heat exchanger element 5 and the second heat exchanger element 23 are arranged in such a way that the air to be heated is firstly applied to the first heat exchanger element 5 and then to the second heat exchanger element 23.

In the text which follows, operation of the vehicle heating circuit 1 is described. The actuation of the individual components is carried out in each case by means of the controller 100, without this being mentioned below with respect to an individual case. The vehicle heating circuit 1 can be operated in various states, as is apparent from the following description.

In a first operating state, no heat is to be supplied to the region to be heated and heat is to be conducted away from the electrical components to be cooled. In this case, the valves 9, 14 and 15 are actuated in such a way that the first liquid circuit 10 and the second liquid circuit 20 are connected to one another in such a way that the liquid is circulated through the electrical components to be cooled (accumulator 4, power electronics 3 and electric motor 2) via the pump 21 (i.e. the upper branch of the vehicle heating circuit 1 in FIG. 1), through the air cooler 7 and the pump 6. With this connection, heat is conducted away from the circulated liquid in the air cooler 7.

In a second operating state, heat is to be supplied to the area to be heated and the waste heat of the electrical components to be cooled is sufficient for this purpose. In this case, the valves 9, 14 and 15 are actuated in such a way that the first liquid circuit 10 is disconnected from the second liquid circuit 20. In the first liquid circuit 10, liquid is circulated by means of the pump 6 via the electrical components (accumulator 4, power electronics 3 and electric motor 2) to be cooled and the first heat exchanger element 5. In the first heat exchanger element 5, the air to be heated is heated by means of the waste heat from the electrical components. Depending on whether or not sufficient heat is conducted away in the first heat exchanger element 5 to cool the electrical components, the valve 9 is actuated in such a way that the liquid flows through the air cooler 7 or the bypass line 11. In this case, the waste heat of the electrical components is therefore efficiently used to heat the area to be heated.

In a third operating state, heat is to be supplied to the area to be heated and the waste heat of the electrical components is not sufficient for this. In this case, the valves 9, 14 and 15 are actuated as in the second operating state. The first liquid circuit 10 and the second liquid circuit 20 are therefore disconnected from one another. In the first liquid circuit 10, the liquid is circulated as in the second operating state. In the second liquid circuit 20, the liquid is circulated through the vehicle heating device 22 and the second heat exchanger element 23 by means of the pump 21. The vehicle heating device 22 is activated here in order to make available additional heat. Depending on the heating demand and possibly according to further peripheral conditions, either the fuel-operated heating apparatus 22a or the electric resistance heater 22b or both can be activated. In this third operating state, the air to be heated is therefore firstly pre-heated in the first heat exchanger element 5 by the waste heat of the electrical components to be cooled. The air to be heated is subsequently heated further to the necessary temperature in the second heat exchanger element 23 by the heat made available by the vehicle heating device 22. Owing to the decoupling of the first liquid circuit 10 and of the second liquid circuit 20, as well as the thermal decoupling of the first heat exchanger element 5 and of the second heat exchanger element 23, the second liquid circuit 20 can be at a significantly higher temperature level here than the first liquid circuit 10. In this way, it is ensured that sufficient heat can be made available for the area to be heated, that the electrical components to be cooled do not undesirably overheat as a result of an additional input of heat by the vehicle heating device 22 and nevertheless the waste heat of the electrical components is used for heating the area to be heated. As a result, the waste heat of the electrical components can be used in an optimum way and the vehicle heating device 22 only ever has to be operated with a heating capacity which compensates for the difference between the required heat for the area to be heated and the waste heat of the electrical components.

In a fourth operating state, heat is to be supplied to the area to be heated and also the electrical components (accumulator 4, power electronics 3 and electric motor 2) are to be heated. Such an operating state can occur, for example, in an electric vehicle or hybrid vehicle at cold external temperatures. In this case, the valves 9, 14 and 15 are actuated in such a way that the first liquid circuit 10 and the second liquid circuit 20 are connected to one another in such a way that the liquid is circulated by means of the pump 6 through the vehicle heating device 22, the second heat exchanger element 23 and the electrical components (electric motor 2, power electronics 3 and accumulator 4). The vehicle heating device 22 is operated again here in order to make available heat. On the one hand (by means of the heat second exchanger element 23) the air to be heated and, on the other hand, the electrical components are heated owing to the circulated liquid which is heated by the vehicle heating device 22.

In a further operating state, heat is made available by the vehicle heating device 22 exclusively by means of the operation of the electric resistance heater 22b if an external supply voltage can be made available. This situation occurs, in particular, when the accumulator 4 is being charged by mains current. In this case, the fuel-operated vehicle heating apparatus 22a is not activated in order to save fuel. The heat from the electric resistance heater 22b can be used here again, by means of corresponding actuation of the valves 9, 14 and 15, either only to heat a vehicle interior space or else to heat the electrical components. In this way, exclusively electrical stationary-state conditioning of the interior space and/or of the electrical components is made available.

A heat exchanger arrangement 30 and a vehicle heating circuit 1 are therefore made available with which the waste heat of electrical components to be cooled can be used efficiently to heat an area to be heated and the vehicle heating device 22 only has to make available the additionally necessary heat when necessary. In this way, a saving in energy is achieved in the vehicle heating device 22. In addition, the arrangement can be integrated into an existing heating, ventilation and air-conditioning module of a vehicle with small adaptations. Furthermore, heating of the electrical components is also made possible in a simple and compact way when necessary. The vehicle heating device 22 can be used here both for heating the area to be heated and for heating the electrical components.

The invention claimed is:

1. A vehicle heating circuit, comprising:
a first heat exchanger element for transmitting waste heat from at least one vehicle electrical component to be cooled to air, and a second heat exchanger element for transmitting heat from at least one vehicle heating device to air,
wherein the first heat exchanger element and the second heat exchanger element are arranged in such a way that air to be heated is successively applied to them;
wherein the first heat exchanger element is connected into a first liquid circuit in which the one or more electrical component to be cooled is arranged,
wherein the second heat exchanger element is connected into a second liquid circuit in which the one or more vehicle heating device is arranged, and
wherein the first liquid circuit and the second liquid circuit are connected to one another via connecting lines, and valves are provided with which the first liquid circuit and the second liquid circuit can be connected to one another and disconnected from one another.

2. The vehicle heating circuit as claimed in claim 1, wherein the first heat exchanger element and the second heat exchanger element are arranged in such a way that the air to be heated is firstly applied to the first heat exchanger element and then to the second heat exchanger element.

3. The vehicle heating circuit as claimed in claim 1, wherein the first heat exchanger element and the second heat exchanger element are each formed as liquid-to-air heat exchangers.

4. The vehicle heating circuit as claimed in claim 1, wherein the first heat exchanger element and the second heat exchanger element are thermally decoupled from one another.

5. The vehicle heating circuit as claimed in claim 1, wherein the first heat exchanger element and the second heat exchanger element are arranged in a common housing.

6. The vehicle heating circuit as claimed in claim 1, wherein the at least one electrical component to be cooled comprises a vehicle battery and/or an electric vehicle drive motor and/or at least one electronic component of the drive train of the vehicle.

7. The vehicle heating circuit as claimed in claim 1, wherein the at least one vehicle heating device comprises a fuel-operated vehicle heating apparatus.

8. The vehicle heating circuit as claimed in claim 1, wherein the at least one vehicle heating device comprises an electric resistance heater.

9. The vehicle heating circuit as claimed in claim 8, wherein the vehicle heating device is configured in such a way that when an electrical supply voltage is available only the electric resistance heater provides heat.

10. The vehicle heating circuit as claimed in claim 1, wherein the first liquid circuit and the second liquid circuit are connectable to one another in such a way that the electrical components can be heated with the vehicle heating device.

11. The vehicle heating circuit as claimed in claim 1, wherein a controller is provided with which the valves are connected and by which the valves can be actuated.

* * * * *